Sept. 24, 1963 C. WEBER 3,104,835
ICE CHIPPER FOR DISPENSING UNITS
Filed June 25, 1959 3 Sheets-Sheet 1
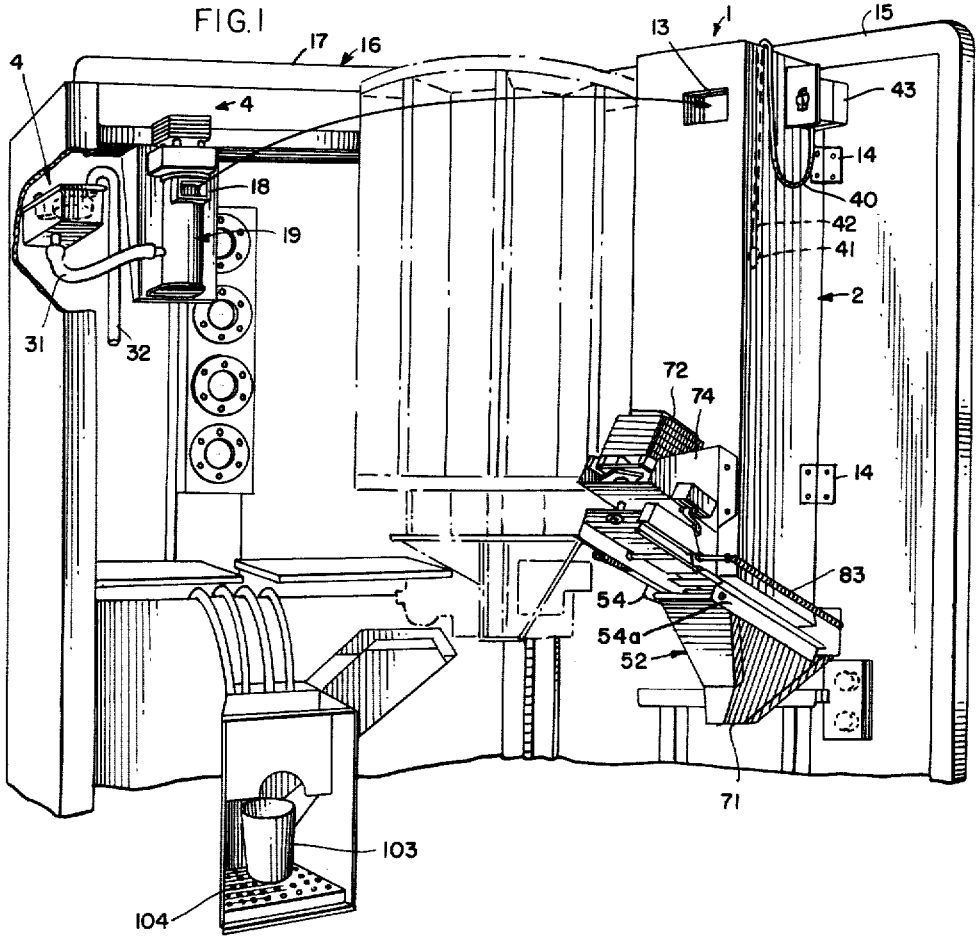
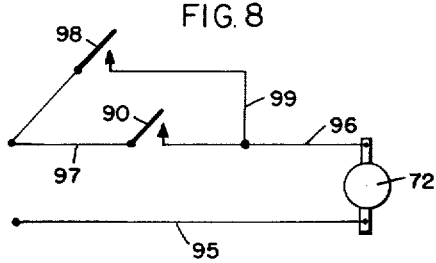
INVENTOR:
CARL WEBER
BY
ATT'YS Sept. 24, 1963 C. WEBER 3,104,835
ICE CHIPPER FOR DISPENSING UNITS
Filed June 25, 1959 3 Sheets-Sheet 2
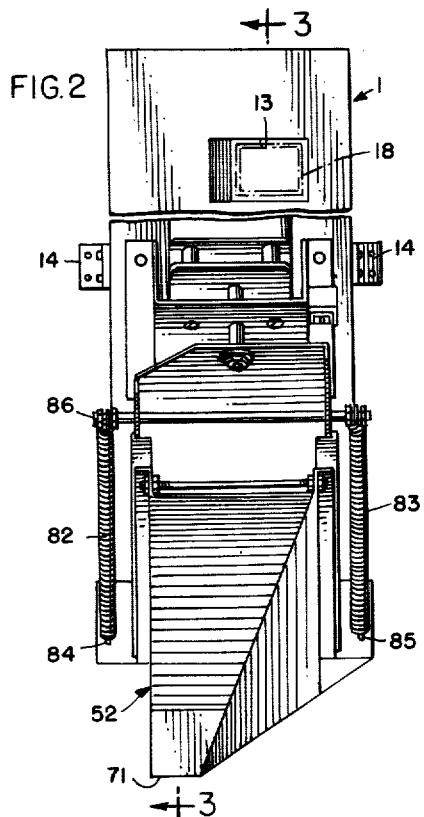
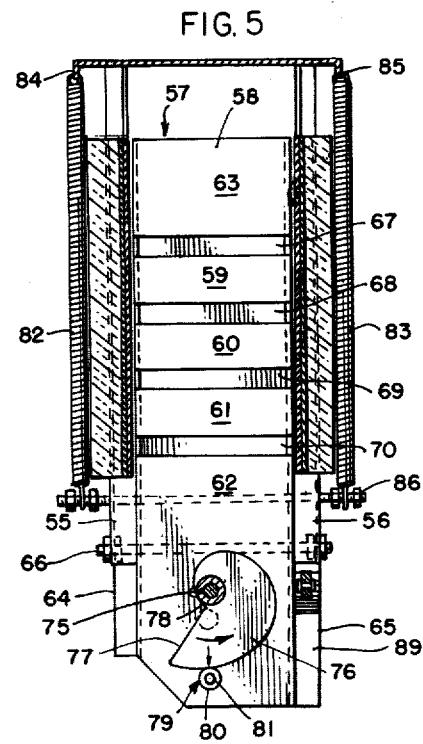
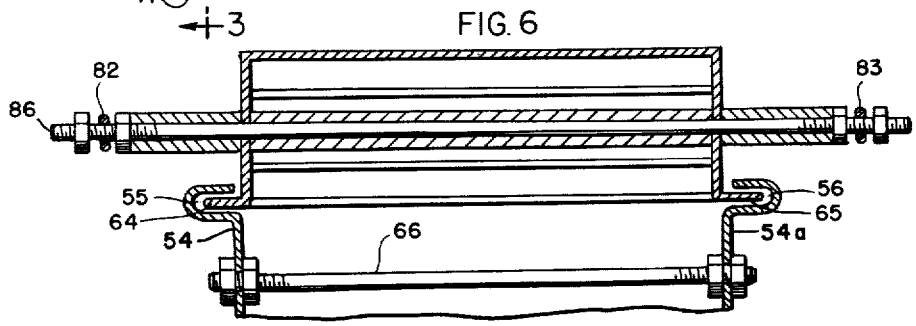
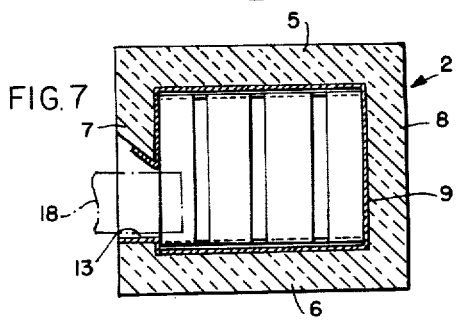
INVENTOR:
CARL WEBER
BY Marzell, Johnston,
Cook & Root
ATT'YS

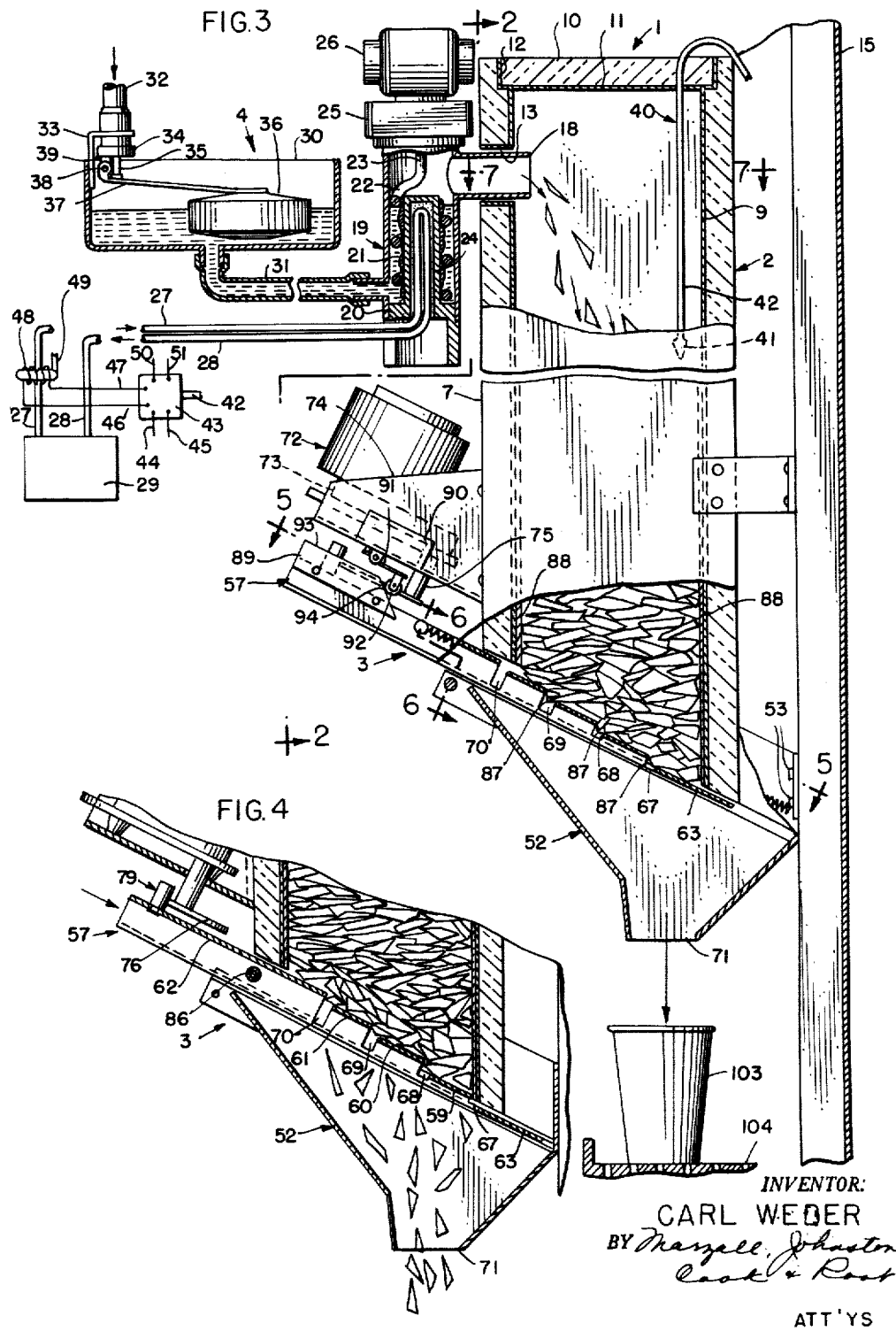

United States Patent Office 3,104,835
Patented Sept. 24, 1963

3,104,835
ICE CHIPPER FOR DISPENSING UNITS
Carl Weber, Chicago, Ill., assignor to Automatic Canteen Company of America, Chicago, Ill., a corporation of Delaware
Filed June 25, 1959, Ser. No. 822,768
7 Claims. (Cl. 241—94)

This invention relates to dispensing units and, more particularly, to dispensing units which are particularly well adapted for dispensing ice, in bulk, in the form of charges of cracked or chipped ice.

It is a primary object of the present invention to afford a novel unit for dispensing cracked or chipped ice.

Another object is to provide a novel unit for storing and dispensing ice in a novel and expeditious manner.

A further object is to afford a novel unit of the aforementioned type wherein cracked or chipped ice may be dispensed in individual charges of predetermined size in a novel and expeditious manner.

In affording a storage and dispensing unit for ice, which is capable of storing a supply of ice and dispensing individual charges of predetermined size therefrom, several inherent difficulties are encountered in the storage and in the dispensing of the ice. These difficulties include inefficiency in operation; the danger of jamming of the dispensing mechanism; unreliability in the measurement of the size of the individual successive charges of the ice to be dispensed; complicatedness and expensiveness of construction; and the problem of producing a unit which is sufficiently small and compact for practical purposes, or the like. It is an important object of the present invention to overcome such difficulties.

A further object of the present invention is to enable a supply of ice, which is to be dispensed, to be stored in a novel and expeditious manner.

An ancillary object is to enable flake ice to be stored in a novel and expeditious manner for dispensing.

Another object of the present invention is to afford a novel dispenser unit operable to dislodge and dispense ice in bulk, in the form of cracked or chipped ice from a storage supply of ice in a novel and expeditious manner.

A further object of the present invention is to afford a novel cutter for an ice dispensing unit.

Yet another object is to afford an ice dispensing unit operable, and embodying parts constituted and arranged, in a novel and expeditious manner.

Another object is to enable a novel ice dispenser to be afforded which may be recharged with ice to be dispensed in a novel and expeditious manner.

Other and further objects of the present invention will be apparent from the following description and claims and are illustrated in the accompanying drawings which, by way of illustration, show the preferred embodiment of the present invention and the principles thereof, and what I now consider to be the best mode in which I have contemplated applying these principles. Other embodiments of the invention embodying the same or equivalent principles may be used and structural changes may be made as desired by those skilled in the art without departing from the present invention and the purview of the appended claims.

In the drawings:

FIG. 1 is a partial front perspective view of a cup-type beverage vending machine having an ice dispenser embodying the principles of the present invention mounted therein;

FIG. 2 is a front elevational view of a portion of the mechanism shown in FIG. 1;

FIG. 3 is a longitudinal sectional view taken substantially along the line 3—3 in FIG. 2, but with the door of the cabinet shown in FIG. 1 disposed in closed position, and with a portion of the mechanism shown diagrammatically;

FIG. 4 is a detail sectional view showing a portion of the mechanism shown in FIG. 3, but with parts thereof disposed in different position;

FIG. 5 is a detail sectional view taken substantially along the line 5—5 in FIG. 3;

FIG. 6 is a detail sectional view taken substantially along the line 6—6 in FIG. 3;

FIG. 7 is a detail sectional view taken substantially along the line 7—7 in FIG. 3; and FIG. 8 is a wiring diagram showing a control circuit for the dispensing mechanism of the dispenser shown in FIG. 1.

An ice dispenser 1, embodying the principles of the present invention, is shown in the drawings to illustrate the preferred embodiment of the present invention.

In general, the ice dispenser 1 shown in the drawings includes a storage housing or cabinet 2, for storing a supply of ice to be dispensed, a dispenser mechanism 3 mounted on the bottom of the housing 2 for dispensing chipped or cracked ice from the bottom of the supply of ice in the housing 2, and an ice making mechanism 4 for feeding flake ice into the storage housing 2.

The housing 2 embodies two substantially upright parallel side walls 5 and 6, FIGS. 1, 3 and 7, a front wall 7 and a rear wall 8, with the front and rear walls 7 and 8 disposed substantially parallel to each other and perpendicular to the side walls 5 and 6. The walls 5–8 are preferably made of suitable insulating material such as, for example, cork, or the like, and are preferably lined on their inner faces throughout their lengths with a wear-resistant, protective lining 9 made of suitable material such as, for example, sheet steel. A top wall 10 also made of cork or other suitable insulating material and embodying an inner lining 11, is mounted in a suitable recess 12 formed in the upper edge portions of the walls 5–8.

The front wall 7 of the housing 2 has an opening 13 extending through the upper end portion thereof whereby, in the operation of the ice dispenser 1, ice may be fed into the housing 2 for storage therein prior to dispensing therefrom by the dispensing mechanism 3.

In the drawings, the housing 2 is shown mounted by suitable mounting brackets 14, FIGS. 1, 2 and 3, on the inside face of a door 15 of a beverage vending machine 16. The dispenser mechanism 3 is also mounted on the door 15 for movement therewith, at the lower end portion of the housing 2, as will be discussed in greater detail presently. The ice making mechanism 4 is mounted in the housing 17 of the vending machine 16 and includes a nozzle or chute 18 which extends through the opening 13 into the interior of the housing 2 when the door 15 is disposed in closed position, as shown in FIG. 3, the ice making mechanism 4 being operable to feed ice into the housing 2 through the chute 18 when so disposed relative to the housing 2, as will be discussed in greater detail hereinafter.

The ice making mechanism 4 shown in the drawings is of a type readily available on the market and includes an elongated substantially cylindrical-shaped housing 19. The chute 18 opens substantially horizontally outwardly from the upper portion of the housing 19, and the housing 19 is closed at its upper and lower ends. The bottom wall 20 of the housing 19 includes a substantially inverted cup-shaped central portion 21 which projects upwardly into the housing 19. A feed screw 22 having an elongated substantially straight shank portion 23 at its upper end, and a helical-shaped portion 24 at its lower end, is mounted in the housing 19, with the helical-shaped portion 24 disposed around the upwardly projecting portion 21 of the bottom wall 20 of the housing 19, and the upper end portion 23 projecting upwardly through the top of the housing 19. The feed screw 22 may be made of any suitable material such as, for example, brass rod material formed to afford the straight elongated shank portion 23 and the helical-shaped lower end portion 24.

The shank portion 23 is connected through a suitable reduction gear unit 25 to a motor 26 mounted on the upper end of the housing 19 whereby upon operation of the motor 26 the feed screw 22 is rotated around the longitudinal axis of the shank portion 23 in a clockwise direction as viewed when looking downwardly thereon, to thereby correspondingly revolve the helical portion 24 around the central portion 21 of the bottom wall 20 for a purpose which will be discussed in greater detail presently.

A refrigerant line, including a feed line 27 and a return line 28 projects upwardly into the central portion 21 of the bottom wall 20 and is connected to a suitable refrigeration unit 29, FIG. 3, which may be mounted in any suitable location such as in the vending machine cabinet 17. A water supply tank 30 is connected through a suitable conduit 31, extending from the bottom thereof, to the lower end portion of the housing 19. The supply tank 30 may be connected to a suitable source of water, not shown, by a conduit 32 mounted on the tank 30 by a supporting bracket 33. A valve 34 is mounted on the discharge end of the conduit 32 and includes a plunger 35 for controlling the opening and closing of the valve 34. The plunger 35 is so associated with the valve 34 that when the plunger 35 is disposed in the position shown in FIG. 3, the valve 34 is closed and when the plunger 35 moves downwardly from the position shown in FIG. 3, the valve 34 is opened.

A float 36 is disposed in the tank 30 and has an arm 37 projecting from the upper surface thereof. The free end portion of the arm 37 is pivotally mounted by suitable means such as a pin or pawl 38 to a bracket 39 projecting downwardly from the valve 34 to thereby pivotally mount the float 36 for upward and downwardly swinging movement around the pin 38. The arm 37 is so disposed in the tank 30 that the plunger 35 of the valve 34 rests on the upper face thereof, and the valve 34, the arm 37 and the float 36 are so disposed relative to each other that when the water in the tank 30 rises to the level shown in FIG. 3, the arm 37 is effective to press the plunger 35 upwardly into position to close the valve 34. It will be seen that the level of the water in the tank 30 when the float 36 is disposed in the last mentioned position is such that the water fed therefrom into the housing 19 is disposed below but closely adjacent to the upper end of the central portion 21 of the bottom wall 30, and to the bottom of the chute 18.

The upwardly projecting portion 21 of the bottom wall 20 is so disposed in the housing 19 that the helical portion 24 of the feed screw 22 is disposed in relatively close fitting relation between the portion 21 and the adjacent side wall portions of the housing 19. When refrigerant is fed through the line 27—28 with water disposed in the housing 19, and with the motor 26 energized, ice is continuously formed on the outer face of the upwardly projecting portion 21 of the bottom wall 20, and the rotation of the helix 24 of the feed screw 22 around the upwardly projecting portion 21 is effective to continuously break the ice so formed from the outer surface of the outwardly projecting portion 21 and feed it upwardly toward the chute 18. The water in the housing 19 also helps to float the thus formed ice upwardly and as water is converted into ice, additional water is automatically fed into the housing 19 from the tank 30. As the ice thus formed is moved upwardly by the helix 24 and the floating action of the water in the housing 19, it accumulates in the upper end portion of the housing 19 until it spills outwardly through the chute 18 into the storage housing 2 in the form of flake ice. It will be seen that as the water level in the tank 30 drops, the float 36 drops therewith to thereby open the valve 34 and replenish the supply of water in the tank 30.

The dispenser mechanism 3 affords a bottom wall for the storage housing 2, as will be discussed in greater detail presently, and the supply of flake ice is normally permitted to build up in the housing 2 to a level sufficient to insure that the amount of ice stored in the housing 2 and the amount of ice which may be made by the ice making mechanism 4 will be more than sufficient to meet the demand during any expected period of ice dispensing operation of the dispensing unit 1.

A temperature sensing unit 40 is mounted in the storage housing 2 in position effective to sense the level of ice stored in the housing 2. The temperature sensing unit 40 may be of any one of several types commonly available on the market such as, for example, a combination tube and bulb unit embodying a bulb 41 mounted on one end of a tubular conduit 42, with the tube and bulb unit filled with a suitable gaseous working fluid such as, for example, Freon-12, and with the other end of the tubular member 42 connected to a suitable control unit 43 in a manner well known in the art. As may be seen in FIGS. 1 and 3, the bulb 41 of the temperature sensing unit 40 may be disposed in the housing 2 at a suitable position below the opening 13, the tube 42 extending downwardly through the cover member 10 and being connected to the control unit 43 which may be mounted on the inner face of the door 15 adjacent to the housing 2, FIGS. 1 and 3. The control unit 43 may be connected to a suitable source of electric power, not shown, by suitable conductors 44 and 45, and it may also be connected by suitable conductors 46 and 47 to a suitable electrically operated control valve 48 connected into the refrigerant feed line 27. The valve 48 may also be connected to a suitable discharge line 49 such as, for example, a line connected into the main refrigeration system, not shown, in the vending machine 16.

The temperature sensing unit 40 and the control unit 43 may be so set, that when the temperature sensed by the sensing unit 40 is above a predetermined temperature, the control unit 43 is effective to actuate the valve 48 to close the connection between the refrigerant feed line 27 and the bypass or discharge line 49 and open the feed line 27, to thereby permit refrigerant to flow from the refrigeration unit 29 through the feed line 27 and return to the unit 29 through the return line 28, thus cooling the water in the housing 19. When the temperature sensed by the sensing unit 40 is below the aforementioned predetermined temperature, the sensing unit 40 is effective to actuate the valve 48 to thereby close the feed line 27 and connect the same to the discharge line or bypass line 49, to thereby stop the flow of refrigerant through the ice making mechanism 4, and thus stop the formation of ice thereby. The control mechanism 43 may also be connected by suitable conductors 50 and 51 to suitable controls, not shown, for the motor 26 to thereby energize and deenergize the motor 26 in accordance with whether refrigerant is, or is not, flowing through the ice making mechanism 4, respectively.

The housing 12 is constructed primarily of insulated material. However, it will be seen that it is not subjected to any refrigeration or cooling effect other than the cooling effect of the ice stored therein. Therefore, the ice stored in the housing 2 is stored at substantially its melting point or, in other words, normally at substantially 32° F. The temperature sensing unit 40 and the control 43 is preferably so set that when the bulb 41 rests on, or is relatively closely adjacent to ice in the housing 2, the supply of refrigerant to the ice making mechanism 4 is cut off and the motor 26 is deenergized so that ice is not fed from the ice making mechanism 4 into the housing 2. It has been found that if the supply of refrigerant to the ice making mechanism of the type shown in the drawings is not cut off during periods of inactivity, of the ice making mechanism, the feed screw 22 tends to become so solidly embedded in ice formed within the housing 19 that the motor 26 tends to stall, and there is likelihood of breaking the feed screw 22 when the motor is again energized. It will be seen that with my novel arrangement of parts, this danger is alleviated because the supply of refrigerant to the housing 19 is cut off during the periods of inactivity of the ice making mechanism 4 and therefore the solid buildup of ice within the housing 19 is prevented.

It will be appreciated by those skilled in thte art that the ice making mechanism 4 is shown herein merely by way of illustration and not by way of limitation, and that other types of ice making mechanism, and in fact other means of supplying ice to the housing 2, including the manual feeding of ice thereinto, may be used without departing from the purview of the present invention. It is to be understood that the ice making mechanism 4 shown in the drawings does not embody any part of the present invention except insofar as it forms a part of the entire combination.

The dispensing mechanism 3 includes a discharge chute or funnel 52 secured by suitable means such as bolts 53 to the inner face of the door 15 below and in alignment with, the housing 2. The funnel 52 includes two upwardly projecting side flanges 54 and 54a, FIGS. 1 and 6, having respective inwardly facing parallel guideways 55 and 56 formed therein. The guideways 55 and 56 are disposed at a forwardly and upwardly opening acute angle to the horizontal, FIGS. 1 and 3, and afford guideways for guiding and supporting an elongated slide 57 for longitudinally reciprocation forwardly and rearwardly across the bottom of the housing 2 at the aforementioned acute angle.

The slide 57 may be made of any suitable material such as, for example, sheet steel, and embodies a substantially flat body portion 58 and a plurality of substantially parallel cutter members or cutter bars 59, 60, 61 and 62 disposed in progressively elevated relation to each other from the rear to the front of the slide 57, FIGS. 3, 4, 5 and 6. The body portion 58 includes a rear end portion 63 and two oppositely disposed side edge portions 64 and 65, which extends substantially the length of the slide 57 and are disposed in the same plane as the rear end portion 63. The cutter bars 59—62 are disposed between the side edge portions 64 and 65 and project upwardly thereabove, FIGS. 3, 5 and 6. The slide 57 is mounted in the upper end portion of the discharge funnel 52, with the edge portions 64 and 65 disposed in the guideways 55 and 56, respectively, for longitudinal reciprocation therealong. The rear end portions of the flanges 54 and 54a are secured by the bolts 53 to the inner face of the door 15 and the front end portions thereof are secured together by a suitable cross brace 66, FIGS. 5 and 6.

As may be seen in FIGS. 3, 4 and 5, the cutter bar 59 is disposed in forwardly spaced relation to the rear end portion 63, and the cutter bars 60, 61 and 62 are disposed in forwardly spaced relation to the cutter bars 59, 60 and 61, respectively, to thereby afford openings 67, 68, 69 and 70, respectively therebetween.

When the slide 57 is mounted in the guideways 55 and 56, and is disposed in normal, at-rest position such as shown in FIG. 3, it extends across the open bottom of the housing 2, with the cutter bars extending upwardly between the side walls 5 and 6 of the housing 2 to thereby afford a perforated bottom wall for the housing 2. When ice is disposed in the housing 2, it rests on top of the slide 57 and when the slide 57 is moved from its normal, at-rest position as shown in FIG. 3 toward its fully actuated position as shown in FIG. 4, the rear edge portions of the cutter bars 59—62 are moved across the supply of ice in the housing 2 in a manner effective to shear or break off ice from the lower end portion thereof and permit the thus broken off ice to drop downwardly through the openings 67—70 into the discharge funnel 52 and be discharged downwardly through the discharge opening 71 in the bottom thereof.

It will be seen that with the slide 57 disposed at the aforementioned acute angle to the horizontal, the supply of ice in the housing 2 tends to settle in the rear of the housing 2 so that it rests against the rear wall 8 thereof. This is not of as great significance when the housing 2 has a normal supply of ice therein as when it has an abnormally small supply of ice. Thus it will be seen that, with the slide 57 disposed at the aforementioned acute angle, even when the supply of ice is so small that it is insufficient to completely cover the slide 57, the ice that does rest thereon is disposed against the rear wall 8 and is thus prevented from moving with the slide during a shearing movement thereof. Thus, dispensing of ice is assured in the operation of my novel dispenser 1 even when abnormally small supplies of ice are present in the housing 2.

A motor 72 having a suitable reduction gear unit 73 mounted on the lower end thereof is mounted by brackets 74 on the front face of the housing 2 above the slide 57. A drive shaft 75 extends downwardly from the reduction gear unit 73 and has a cam plate 76 mounted thereon for rotation therewith, FIGS. 3, 4 and 5. During operation of the motor 72, the cam plate 76 is rotated in a counterclockwise direction as viewed in FIG. 5 through the rotation of the drive shaft 75. The outer peripheral edge of the cam 76 is shaped to afford a trailing edge 77 which projects substantially radially outwardly relative to the longitudinal axis of the drive shaft 75, FIG. 5. From the trailing edge 77, the outer peripheral edge of the cam 76 extends in a counterclockwise direction as viewed in FIG. 5 in a substantially constantly and ever diminishing spiral back to the trailing edge 77, and terminates against the trailing edge 77 in an abutment surface 78 which is disposed a substantial distance radially inwardly from the outer end of the trailing edge 77.

A cam follower 79 in the form of a roller 80 mounted on a pin 81, is mounted on and projects upward from the upper face of the front end portion of the slide 57, FIGS. 3 and 5. The cam follower 79 is disposed on the slide 57 in parallel relation to the drive shaft 75 with both the drive shaft 75 and the cam follower 79 disposed on the longitudinal center line of the slide 57. The two tension coil springs 82 and 83 are disposed on opposite sides of the slide 57, with the rear end portions thereof connected to ears 84 and 85, respectively, struck forwardly out of the upper rear edge portion of the funnel 52, FIGS. 3 and 5. The front end portions of the springs 82 and 83 are connected to a rod 86 which extends through the front end portion of the slide 57, FIGS. 5 and 6. The springs 82 and 83 are effective to urge the slide 57 rearwardly in the guideways 55 and 56 to thereby yieldingly hold the cam followed 79 against the outer peripheral edge of the cam 76.

When the cam 76 is disposed in normal, at-rest position, it is disposed in the position shown in FIG. 5, and the cam follower 79 is then engaged with the outer peripheral edge of the cam 76 relatively close to, but spaced from, the trailing edge 77. During an ice dispensing operation of the ice dispenser 1 shown in the drawings, the cam 76 is rotated in a counterclockwise direction, as viewed in FIG. 5, through a single rotation, as will be discussed in greater detail presently. During the initial portion of such a rotation of the cam 76, the cam follower 79 rides along the aforementioned spiral-shaped portion of the outer peripheral edge thereof for preferably approximately thirty degrees of rotation of the cam 76, until it reaches the trailing edge 77. When the cam 76 has rotated sufficiently to move the trailing edge 77 past the cam follower 79, the springs 82 and 83 are effective to move the slide 57 rearwardly, with the follower 79 moving rearwardly along the trailing edge 77 toward the drive shaft 75 until the cam follower 77 engages the abutment surface 78. The springs 82 and 83 are preferably of sufficient strength that this rearward movement of the slide 57 effected thereby is relatively fast, and it will be seen that the abutment surface 78 is so disposed relative to the trailing edge 77 that the cam follower 79 is moved directly there against so that, when the cam follower 79 engages the abutment surface 78, the rearward movement of the slide 57 is quickly or suddenly stopped. This sudden stopping of the rearward movement of the slide 57 is effective to sharply jar or shake the slide 57 and, preferably, even the housing 2, to thereby assist in causing the ice broken from the bottom of the supply of ice in the housing 2 to fall freely downwardly from the slide 57, and also to assist in causing the supply of ice within the housing 2 to move downwardly therein.

After the slide 57 has thus been moved rearwardly by the springs 82 and 83 during the rotation of the cam plate 76, the continued rotation of the cam plate 76 causes the cam follower 79 to ride outwardly along the outer peripheral edge thereof into its aforementioned normal, at-rest position thereon. This movement of the cam follower 79 is effective to again return the slide 57 to its forwardly disposed, normal, at-rest position shown in FIGS. 3 and 5.

When a supply of ice is disposed in the housing 2 and rests on the slide 57 for any appreciable period of time, the pressure of the ice against the upper surface of the slide 57 causes the surface of the ice immediately adjacent to the slide 57 to melt and thereby tends to cause the ice to settle somewhat in the housing 2 with portions of the ice such as the portions 87 shown in FIG. 3, tending to push downwardly through the openings 67, 68 and 69 in the slide 57. Such projections of ice through the openings 67—69 tend to jam or lock the slide 57 in normal position against rearward movement. It will be seen that with the outer peripheral edge of the cam plate 76 extending from the abutment surface 78 to the trailing edge 77 in an ever increasing spiral, and with the normal position of the cam plate 76 being such that the cam follower 79 is engaged with this spiraling surface in spaced relation to the trailing edge 77, the initial movement of the slide 57 upon initiation of a cycle of rotation of the cam plate 76 is forwardly so that the stepped portions 63, 59, 60, 61 and 62 move forwardly relative to the supply of ice in the housing 2 to thereby free the trailing edges or cutting edges of the cutter bars 59—62 from the projections 87. Thus, when the slide 57 is thereafter freed by the cam 76 to the inward urging of the springs 82 and 83, the initial rearward movement of the slide 57 is relatively free so that the slide 57 is moving rearwardly at relatively high speed prior to shearing engagement of the cutter bars 59—62 with the ice, and the cutter bars 59—62 are rendered exceptionally effective to shear or break off the lower portion of the supply of ice in the housing 2.

It has been found that one of the problems encountered in endeavoring to afford an ice dispenser which is effective to dispense successive, substantially equal charges of cracked or chipped ice is that the supply of ice tends to harden or glaze over adjacent to the cutter. Another problem has been found to be that of preventing the ice dispenser from becoming jammed. Another problem has been to insure that the ice moves downwardly in the storage cabinet in a proper manner and to insure that even when the ice supply in the storage cabinet is low, the dispenser will be effective to break off ice therefrom and dispense the same.

The present invention solves the aforementioned problems, and it has been found that it is highly desirable to store the ice to be dispensed in the form of flake ice. In this connection, it is to be noted that three ounces of flake ice by volume constitutes approximately one ounce of ice by weight. By using flake ice in my novel ice dispenser I have not only enabled a dispenser to be afforded wherein the storage housing thereof may be readily resupplied with ice automatically, but I have found that exceptionally accurate results are afforded when it is attempted to control the size of the individual charges of ice dispensed within desirable limits.

Also, the stepped relation of the cutter bars affords an efficient and reliable cutter mechanism. With four cutter bars disposed in the manner of the cutter bars 59—62, it is only necessary for the slide to move approximately one-fourth as far in a cutting stroke as it would be to break off the same amount of ice with a single cutter bar. Also, each cutter bar may take a relatively thin cut, while still producing a relatively large quantity of ice with a relatively short working stroke of the slide 57.

In the operation of the slide 57, I prefer to have the slide move rearwardly from normal, at-rest position, as shown in FIG. 3, to fully actuated position, as shown in FIG. 4, such a distance that each cutter bar moves just more than the width of the next cutter bar disposed rearwardly thereof plus the width of the opening 68, 69 or 70 between them. With the cutter bars 59, 60 and 61 of equal width, and with the cutter bars 59—62 stepped upwardly in equal amounts, such movement is effective to permit the supply of ice in the housing 2 to move downwardly equal distances upon each successive dispensing operation and to rest relatively uniformly on the slide 57 when the latter is in normal, at-rest position.

To assist in the downward movement of the ice supply in the housing 2, I prefer to line the inner faces of the walls 5–8 with a suitable synthetic plastic sheet material such as, for example, polyethylene sheet material, from the bottom of the walls 5–8 to a height above the level to which the housing is normally filled with ice, as shown in FIG. 3.

A cam plate 89 is mounted on the front edge portion of the slide 57, and a switch 90, having an actuating member 91 with a cam follower 92 on the free end thereof, is mounted on the bracket 74 in position wherein the cam follower 92 rides along the cam plate 89 during reciprocation of the slide 57. The cam plate 89 has a substantially straight, forwardly disposed upper edge portion 93 thereon, disposed substantially parallel to and above the edge portion 65 of the slide 57. The cam plate 89 terminates at its rear end portion in an upper edge portion 94 which projects downwardly and rearwardly from the edge portion 93 at an acute angle, FIG. 3.

The switch 90 is of a type which is spring urged toward normal position so that the actuating member is urged downwardly. The switch 90 and the cam plate 89 are so disposed relative to each other that, when the slide 57 is disposed in normal, at-rest position, the cam follower 92 rests against the surface 94 with the switch 90 open, and when the cam follower rests on the surface 93 the switch 90 is closed.

The switch 90 may be included in a control circuit for the motor 72 such as that shown diagrammatically in FIG. 8, wherein it will be seen that one side of the motor 72 is connected by a suitable conductor 95 to a source of electric power, not shown. The other side of the motor 72 is connected by a conductor 96 to one side of the switch 90. The other side of the switch 90 is connected by a conductor 97 to the other side of the aforementioned source of electric power. One side of a normally open switch 98 is connected by a conductor 99 to the conductor 96, and the other side of the switch 98 is connected by a conductor 100 to the last mentioned side of the source of power, to thereby afford a parallel circuit to that through the switch 90 between the source of power and the conductor 96. The switch 98 may be any suitable type of control switch such as, for example, a manually operated, or a coin operated, normally open switch.

With the motor 72 connected to the switches 90 and 98 in the aforementioned manner, it will be seen that when it is desired to initiate a cycle of operation of the motor 72, the switch 98 may be closed to thereby energize the motor 72 for a sufficiently long period of time to move the cam plate 89 into position wherein the cam follower 92 on the switch 90 is engaged with the surface 93, and thereby close the switch 90. Thereafter, the switch 98 may be permitted to open and the motor 72 will continue to run as long as the cam follower 92 is disposed on the cam surface 93. At the close of the reciprocation of the slide 57, the switch 90 is again opened when the cam follower 92 rides downwardly onto the cam surface 94 to thereby open the circuit to the motor 72 and cause the motor 72 to stop.

It will be appreciated by those skilled in the art that the control circuit shown in FIG. 8 for the motor 72 is shown merely by way of illustration and not by way of limitation, and changes therein, and other circuits may be used without departing from the purview of the present invention.

In the operation of the ice dispenser 1 shown in the drawings, the storage housing 2 may be fully charged with a supply of flake ice either by manually charging the same or by operation of the ice making mechanism 4. Thereafter, with the door 15 of the vending machine 16 disposed in closed position, an ice dispensing cycle of operation may be initiated such as, for example, by closing the switch 98. When this occurs, the motor 72 is energized to thereby rotate the cam plate 76 in a counter-clockwise direction from the position shown in FIG. 5. The initial movement of the cam plate 76 relative to the cam follower 79 is such that the slide 57 is, at first, moved forwardly a short distance. Thereafter, the trailing edge 77 of the cam plate 76 rides out from under the cam follower 79 to thereby free the slide 57 for rearward movement by the springs 82 and 83. The springs 82 and 83, in moving the slide 57 rearwardly, cause the cutter bars 59—62 to shear or break off ice from the bottom of the supply of ice present in the housing 2. The ice thus broken off falls downwardly through the openings 67—70 in the slide 57 into the discharge funnel 52 from which they pass downwardly through the discharge opening 71 into a suitable discharge station such as, for example, a cup 103, FIGS. 1 and 3. The rearward movement of the slide 57 is brought to an abrupt stop by the engagement of the cam follower 79 with the abutment surface 78. This abrupt stopping of the movement of the slide 57 is effective to jar the slide 57 and the housing 2 to thereby assist in the discharge of ice from the slide 57 and the downward movement of the supply of ice in the housing 2.

Thereafter, continued rotation of the cam 76 causes the slide 57 to be moved forwardly into the position shown in FIGS. 4 and 5, and when the slide reaches this position, the roller 92 on the switch 90 rides downwardly onto the cam surface 94 to thereby open the switch 90 and deenergize the motor 72.

With the storage cabinet 2 merely affording a storage cabinet for the suppy of ice, and not being refrigerated except by the ice stored therein, it will be seen that the ice stored therein is stored at substantially its melting point which is, of course, normally 32° F. Thus, the ice is relatively soft and, furthermore, tends to readily slide downwardly in the housing 2. When the ice moves downwardly away from the temperature sensing bulb 41 a sufficient distance, the control 43 may be automatically actuated to thereby automatically initiate a cycle of operation of the ice making mechanism 4, as previously described. When the supply of ice in the housing 2 again builds up to a level sufficient to cool the temperature sensing unit 40 sufficiently, the control mechanism 43 is automatically actuated to shut off the ice making mechanism and to bypass the refrigerant therefrom to the other refrigerating mechanism which may be present in the unit.

A suitable drain such as, for example, the drain 104 shown in FIGS. 1 and 3, may be disposed beneath the discharge opening 71 in the discharge funnel 52 so that drainage from ice melting in the storage chamber 2 may be passed downwardly through the openings 67—70 in the slide 57 and the funnel 52 and be carried away through the drain 104.

It will be seen that although the present invention has been described herein as embodied in a beverage vending machine, this is merely by way of illustration and not by way of limitation and that it may be used in other machines or as an individual unit without departing from the purview of the present invention. In this connection, it will be seen that my novel ice dispenser is not only particularly well adapted for use in coin-operated cup-type cold drink beverage vending machines, but it is also well adapted for use in restaurants, soda fountains, and the like, wherein it may be desirable to dispense cracked or chipped ice in successive charges.

Also, it will be seen that all the dispensing mechanism 3 of my novel dispenser 1 is mounted outside of any freezing areas so that it is not subjected to jamming by freezing, and is readily accessible for repair or adjustment.

In addition, it will be seen that I have afforded a novel ice dispenser which is effective and efficient in operation and may be readily and economically produced commercially.

Thus, while I have illustrated and described the preferred embodiment of my invention, it is to be understood that this is capable of variation and modification, and I therefore do not wish to be limited to the precise details set forth, but desire to avail myself of such changes and alterations as fall within the purview of the following claims.

I claim:

1. A dispenser for ice comprising a housing for storing a supply of ice to be dispensed, a cutter extending across the bottom of said housing in position to supportingly engage such a supply of ice in said housing, said cutter being reciprocable across said housing through a working stroke and a return stroke, said cutter being operable during movement through said working stroke to break ice from the bottom of said supply of ice, said cutter being normally disposed in position at a point between the ends of said return stroke, spring means connected to said cutter in position to move the latter along said working stroke, and means for moving said cutter along said return stroke against the urging of said spring means.

2. An ice dispenser comprising supporting means, a slide movably mounted on said supporting means for reciprocation relative thereto through a working stroke and a return stroke, means for supporting a supply of ice in engagement with said slide, said slide including plate means having an upper face extending in the plane of movement of said slide during said strokes, said plate means having cutting means thereon disposed in uniplanar relation thereto in position to chip ice from said supply of ice during movement of said slide through said working stroke, spring means connected to said slide in position to urge said slide to move along said working stroke, abutment means on said slide, cam means engaged with said abutment means and movable through a cycle of movement effective to free said slide for movement by said spring means through said working stroke and to move said slide through said return stroke, and means for moving said cam means through said cycle of movement to thereby so reciprocate said slide.

3. An ice dispenser comprising an elongated housing disposed in substantially upright position for storing a supply of ice to be dispensed, a slide slidably mounted in the bottom of said housing in position to afford a bottom wall therefor supportingly engaged with such a supply of ice, said slide being reciprocable along a path of movement transverse to the length of said housing, said slide having cutter means thereon in position to dislodge chips of ice from the bottom of said supply and cause said chips to fall downwardly from said supply during said reciprocation of said slide, spring means connected to said slide in position to urge said slide to move along one stroke of said reciprocation, a pin mounted on and carried by said slide, a rotatable cam engaged with said pin in position to free said slide for movement through said one stroke and to move said slide through the other stroke of said reciprocation during a single rotation of said cam, and means drivingly connected to said cam for rotating the latter through said single rotation.

4. An ice dispenser as defined in claim 3, and in which said cam includes abutment means for abruptly stopping said slide at the finish of said one stroke to thereby vibrate said slide and said supply of ice.

5. An ice dispenser as defined in claim 3, and in which said slide is normally disposed in position between the ends of said other stroke.

6. An ice dispenser comprising supporting means, a discharge chute mounted on said supporting means, an elongated housing for storing a supply of ice to be dispensed, said housing being mounted on and supported by said supporting means in substantially upright position above said chute, an elongated slide mounted in the bottom of said housing and extending thereacross to afford a bottom wall therefor effective to support such a supply of ice in said housing, said slide being longitudinally reciprocable through a working stroke and a return stroke and having upwardly projecting cutter means thereon in position to break chips of ice from the bottom of said supply and cause said chips of ice to fall downwardly into said chute during said working stroke of said slide, tension coil springs connected to said supporting means and to opposite sides of said slide in position to urge said slide to move along said working stroke, a cam rotatably mounted above said slide and engageable therewith in position to move said slide through said return stroke and free said slide for movement through said working stroke during each revolution of said cam, and motor means mounted on said housing and drivingly connected to said cam for rotating the latter and thereby causing said reciprocation of said slide.

7. A dispenser for ice comprising a housing for storing a supply of ice to be dispensed, a cutter movably mounted in said housing for movement through a working stroke and a return stroke, said cutter having an upper face extending in the plane of said strokes, and a cutting edge facing in the direction said cutter travels during said working stroke, means for supporting such a supply of ice in engagement with said face, said cutter being operable during movement through said working stroke to chip ice from the bottom of said supply of ice, spring means connected to said cutter in position to move the latter along said working stroke, means including a motor operatively connected to cutter for moving the latter along said return stroke against the urging of said spring means, and abutment means for suddenly stopping said cutter at the close of said working stroke to thereby jar said cutter and said supply of ice.

References Cited in the file of this patent

UNITED STATES PATENTS

| | | |
|---|---|---|
| 483,731 | Barber | Oct. 4, 1892 |
| 1,598,977 | McMillen | Sept. 7, 1926 |
| 1,763,512 | Goldstein | June 10, 1930 |
| 1,868,404 | Zeigler | July 19, 1932 |
| 1,990,715 | Steffen | Feb. 12, 1935 |
| 2,237,189 | McCormack et al. | Apr. 1, 1941 |
| 2,753,694 | Trow et al. | July 10, 1956 |

UNITED STATES PATENT OFFICE
CERTIFICATE OF CORRECTION

Patent No. 3,104,835

September 24, 1963

Carl Weber

It is hereby certified that error appears in the above numbered patent requiring correction and that the said Letters Patent should read as corrected below.

Column 3, line 42, for "upward" read -- upwardly --;
column 4, line 64, for "housing 12" read -- housing 2 --;
column 5, line 35, for "longitudinally" read -- longitudinal --;
column 6, line 57, for "followed" read -- follower --.

Signed and sealed this 7th day of April 1964.

(SEAL)
Attest:

ERNEST W. SWIDER
Attesting Officer

EDWARD J. BRENNER

Commissioner of Patents